(12) United States Patent
Lebow et al.

(10) Patent No.: US 9,664,781 B2
(45) Date of Patent: May 30, 2017

(54) TIME-GATED IMAGE RECONSTRUCTION USING PHASE CONJUGATION

(71) Applicants: Paul S. Lebow, Annapolis, MD (US); Thomas G. Giallorenzi, Springfield, VA (US)

(72) Inventors: Paul S. Lebow, Annapolis, MD (US); Thomas G. Giallorenzi, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 506 days.

(21) Appl. No.: 14/212,026

(22) Filed: Mar. 14, 2014

(65) Prior Publication Data
US 2014/0268096 A1    Sep. 18, 2014

Related U.S. Application Data

(60) Provisional application No. 61/781,108, filed on Mar. 14, 2013.

(51) Int. Cl.
| | |
|---|---|
| *G01C 3/08* | (2006.01) |
| *G01S 7/487* | (2006.01) |
| *G01S 17/10* | (2006.01) |
| *G01S 17/89* | (2006.01) |

(52) U.S. Cl.
CPC .......... *G01S 7/487* (2013.01); *G01S 17/107* (2013.01); *G01S 17/89* (2013.01)

(58) Field of Classification Search
CPC ......... G01S 7/487; G01S 17/107; G01S 17/89
See application file for complete search history.

(56) References Cited

U.S. PATENT DOCUMENTS

| | | | | |
|---|---|---|---|---|
| 6,115,123 A | * | 9/2000 | Stappaerts | G01S 7/486 250/201.9 |
| 2007/0030542 A1 | * | 2/2007 | Grasso | G03H 1/0005 359/9 |

OTHER PUBLICATIONS

P. S. Lebow, and J. R. Ackerman, "Phase conjugation through brillouin-enhanced 4-wave mixing over an extended atmospheric path," Opt Lett 14, 236-238 (Feb. 1989).

(Continued)

*Primary Examiner* — Luke Ratcliffe
*Assistant Examiner* — Samantha K Abraham
(74) *Attorney, Agent, or Firm* — US Naval Research Laboratory; Scott G. Bell

(57) ABSTRACT

A method and system are described for illuminating a target with a laser source with a wide-area illuminating beam. A conjugator can receive a reflected, imprinted wavefront from the target that is imprinted with effects from beam distortions and obstructions between the laser source and the target. The conjugator can then generate a hologram. A directed laser beam can then be generated to the target by reading the generated hologram with a second reference beam creating a time-reversed wavefront that can be generated with high gain. The time-reversed wavefront can retrace the path that originated from the laser source to the target, and can reverse the effects of beam distortions and obstructions. Finally, an enhanced return can be received from the target with a receiver, and a time-gating switch can be utilized that selectively selects a particular range of return wavefronts that include wavefronts that reached the target.

10 Claims, 6 Drawing Sheets

(56) References Cited

OTHER PUBLICATIONS

R. J. Grasso, and E. A. Stappaerts, "Linear phase conjugation for atmospheric aberration compensation," Proc. SPIE 3219, 124-132 (Jul. 1997).

M. A. Vorontsov, V. V. Kolosov, and A. Kohnle, "Adaptive laser beam projection on an extended target: phase- and field-conjugate precompensation," J Opt Soc Am A 24, 1975-1993 (Jul. 2007).

* cited by examiner

TIME-GATED IMAGE RECONSTRUCTION USING PHASE CONJUGATION

CROSS-REFERENCE TO RELATED APPLICATIONS

This application claims priority to provisional patent application entitled, "Time-Gated Image Reconstruction Using Phase Conjugation," filed on Mar. 14, 2013, and assigned U.S. Application No. 61/781,108; the entire contents of which are hereby incorporated by reference.

FIELD OF THE INVENTION

The present disclosure relates generally to remote sensing and imaging, and more particularly, to using time-reversed phase conjugation methods to improve light detection and ranging (LIDAR) imaging return signal power.

BACKGROUND

Light Detection and Ranging (LIDAR) is a well-established process for remote sensing and imaging. Commercial systems are widely employed for airborne terrain mapping providing the most accurate topographic data available. Recently, LIDAR technology has been extended to the point where high resolution 3-D imagery can be obtained for the detection and identification of targets. Certain LIDAR configurations provide the ability to range-gate, that is isolate precise range intervals using pulsed lasers and gated detectors. Range-gated LIDAR has been shown to be able to detect and ID partially hidden targets through obscurations such as foliage and smoke. However, current methods requires unacceptably long collection times, as well as small-area (<32×32 pixels), expensive, custom focal planes.

By definition, imaging through an obscuration implies that much of the light is lost in transmission to and from the target. Because of this, complex detection systems and high-powered laser sources are currently required, and to date have offered limited capabilities. For instance, imaging sensors known as Geiger-mode Avalanche Photodiode Arrays (GM-APDs) have been developed over the last several years to provide the sensitivity and timing information required. These are small two-dimensional arrays of detector elements capable of measuring single-photon events and recording their associated time-of-arrival to provide the needed range information to generate a 3-D image. GM-APDs are typically low spatial resolution devices that can be difficult to fabricate, and require long sampling times to accumulate adequate signal-to-noise. State-of-the-art sensors in the short wave IR (SWIR) region (1.2-1.9 microns) typically only provide 32×32 pixel resolution. While R&D continues to improve resolution, signal-to-noise, and timing accuracy, the number of photons available to be detected continues to be the dominant limiting factor.

Conventional LIDAR systems can obtain 3-D imagery of objects of interest, or targets, even when significantly obscured, such as by a tree canopy. However, the returned image from the target is limited and can greatly affect search rates, signal-to-noise, integrations time, and can be quite noisy due to the paucity of returning photons. Therefore, to acquire a usable image in conventional LIDAR systems one must often integrate for a long time, perform multiple passes, reduce the standoff range, and/or resort to prohibitively large and more powerful laser illuminators Accordingly, a need remains in the art to develop a system and method of increasing the amount of light actually striking an obscured target and bypassing and/or reversing the effects of the obscurations by utilizing an optical phase conjugation process.

SUMMARY OF THE INVENTION

According to one aspect of the invention, a method is described for illuminating a target with a laser source with a wide-area illuminating beam. A reflected wavefront can then be sensed from the target with a conjugator after the conjugator receives an imprinted wavefront from the target. The imprinted wavefront can be imprinted with effects from beam distortions and obstructions between the laser source and the target. The conjugator can generate a hologram. A directed laser beam can be generated to the target by reading the generated hologram with a second reference beam creating a time-reversed wavefront that can be generated with high gain. The time-reversed wavefront can retrace the path that originated from the laser source to the target, and can reverse the effects of beam distortions and obstructions. Finally, an enhanced return can be received from the target with a receiver, and a time-gating switch can be utilized that selectively selects a particular range of return wavefronts in the target region, wherein the particular range of return wavefronts comprise wavefronts that reached the target.

According to another aspect of the invention, a laser source can be configured to illuminate a target. A conjugator can be configured to sense a reflected wavefront from the target. A spatial light modulator can be configured to generate a hologram and combine with the laser source to generate a directed laser beam to the target. A receiver can be configured to receive an enhanced return from the target.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF EXEMPLARY EMBODIMENTS

Figure 1:
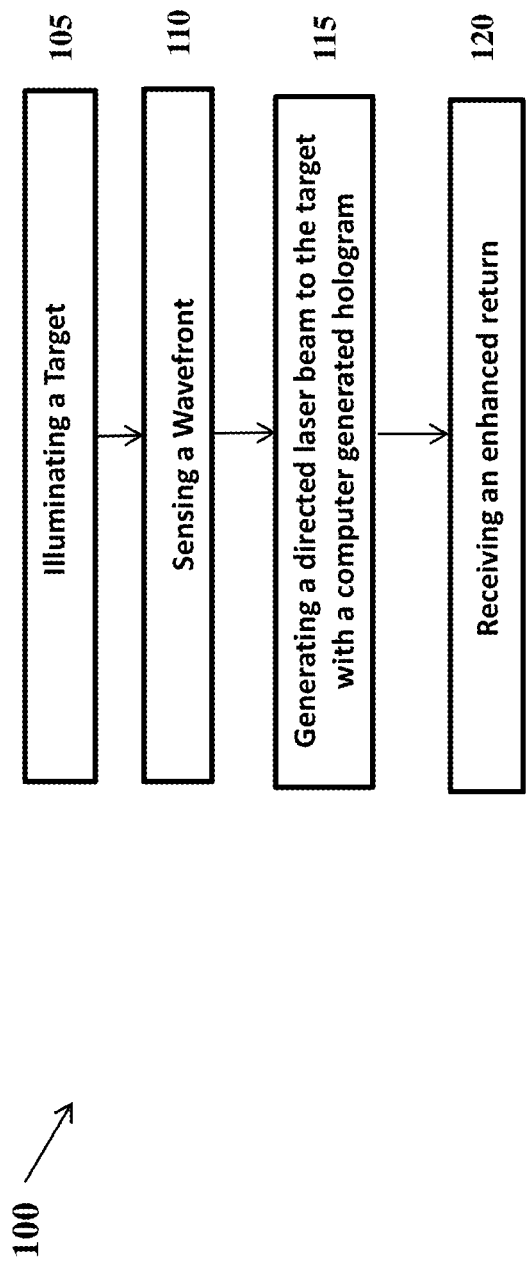
FIG. 1 is a flow chart for an image reconstruction method, in accordance with an exemplary embodiment of the invention.

One or more embodiments or implementations are hereinafter described in conjunction with the drawings, where like reference numerals refer to like elements throughout, and where the various features are not necessarily drawn to scale.

Optical phase conjugation is a holographic phenomenon that can generate a time-reversed replica of an input lightwave. This time-reversed output wavefront can be highly amplified in the optical phase conjugation process, and can retrace the path and reverse the effects of scattering and distortions experienced by an input light wave. By incorporating time-reversal techniques into LIDAR imaging, the signal can be significantly increased and traditional methods of target camouflage and concealment could become significantly less effective as a result. The primary purpose of a time-reversal phase-conjugate process is to redistribute laser energy spatially in such a way to allow the majority of transmitted photons to reach the target with the potential to greatly increase signal-to-noise at the sensor.

FIG. 1 is a flow chart for an image reconstruction method 100, in accordance with an exemplary embodiment of the invention. The image reconstruction method 100 can be a four-step process as opposed to a typical two-step LIDAR process of illuminate and then acquire. The sequence of illustrations in FIGS. 2-5 illustrate how incorporating phase conjugation can, in principle, be used to enhance imaging through obstructions.

Figure 2:
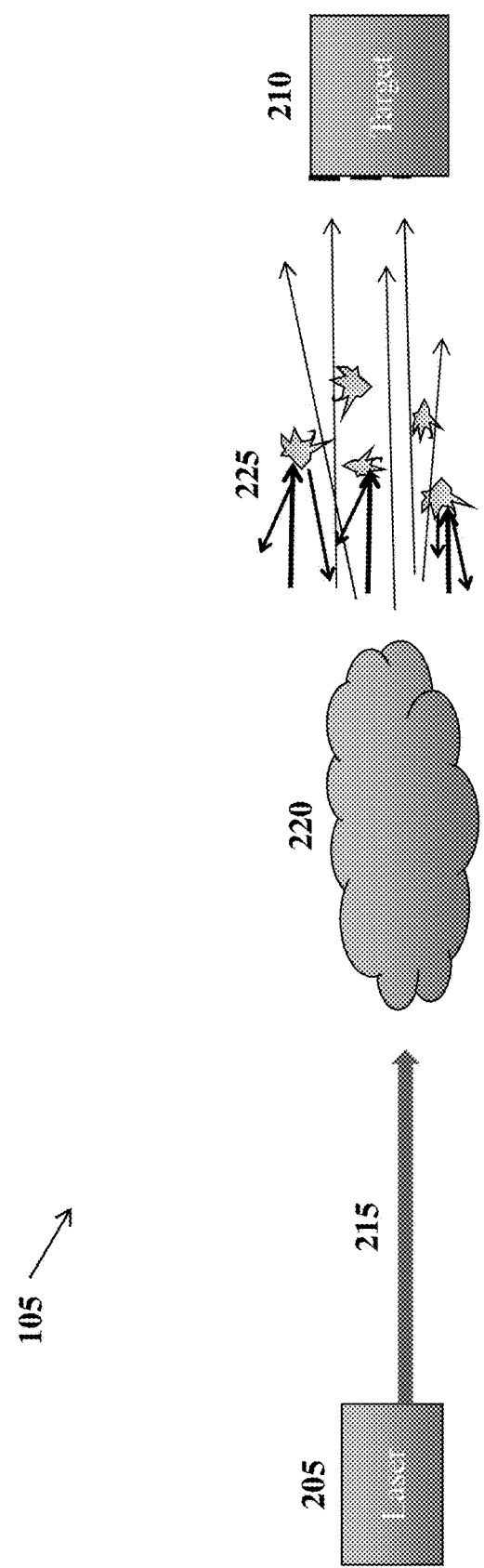
FIG. 2 is a diagram illustrating the step of illuminating the target, in accordance with an exemplary embodiment of the invention.

FIG. 2 is a diagram illustrating the step 105 of illuminating the target, in accordance with an exemplary embodiment of the invention. In step 105, a laser source 205 can provide a wide-area initial illuminator beam 215, or search beam, towards an extended object of interest, or target 210. One of ordinary skill in the art will understand that this initial illuminator beam is similar to a standard LIDAR process. This initial LIDAR illumination probe can suffer from greatly diminished illumination intensity at the target 210 due to beam distortions 220, such as path distortions and turbulence index fluctuations, as well as to scattering caused by obstructions 225, such as foliage. Therefore, in general, the initial illuminator beam 215 may only provide a weak illumination of the target 210 due to the scattering and beam distortions before most of the light even reaches the hidden target 210.

Figure 3:
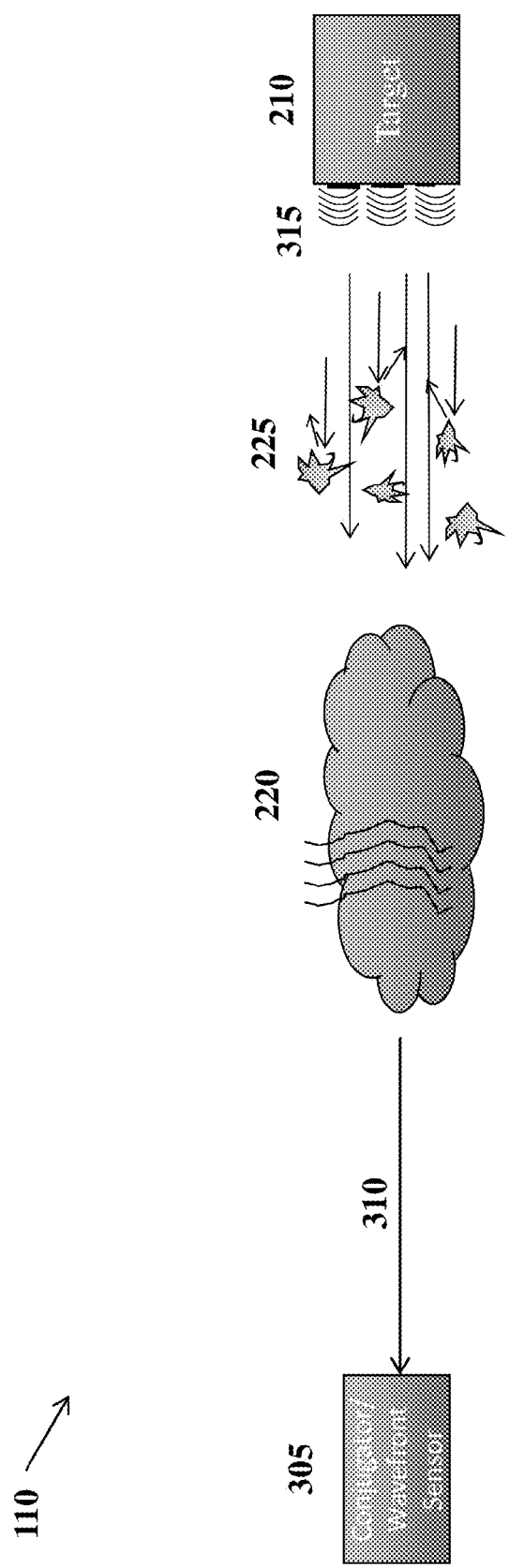
FIG. 3 is a diagram illustrating the step of sensing a return wavefront from the target, in accordance with an exemplary embodiment of the invention.

FIG. 3 is a diagram illustrating the step 110 of sensing a reflected wavefront from the target, in accordance with an exemplary embodiment of the invention. Step 110 can also be known as a "write" process in the exemplary method 100 where a reflected wavefront 315 can be sensed by a conjugator 305. The conjugator 305 can then generate holographic information, which can be used in Step 115 where this hologram is "read" to complete the phase conjugation process. In this step, any earlier reflections from the beam distortions 220 or obstructions 225 themselves are not sensed by "gating out" signals. Therefore, the sensor can be turned on and receptive to photons that have traveled the longer distance to the target 210. (This is illustrated later in FIG. 6 by the "time-gating switch 615.) This gating can be accomplished in a variety of ways, such as an optical switch (e.g., Kerr Cell or Pockels Cell), or the sensor itself can be turned on after an appropriate time interval. For example, this can be accomplished with an image intensified focal plane array 605 that can inherently be switched on and off in the times scales needed to block the obstruction returns but allow the target returns to be detected.

In summary, in step 110 a weak reflected wavefront 315, or returning signal photons or time-gated signal return, can be returned to a conjugator 305 from the target 210. The reflected wavefront 315 can become an "imprinted" wavefront 310 with effects due to beam distortions 220, such as turbulence, and obstructions 225, such as foliage. At the conjugator 305, the imprinted wavefront 310 can be "sensed." That is, it can interact with the initial illuminator beam 215 to write a hologram in the conjugator 305.

Figure 4:
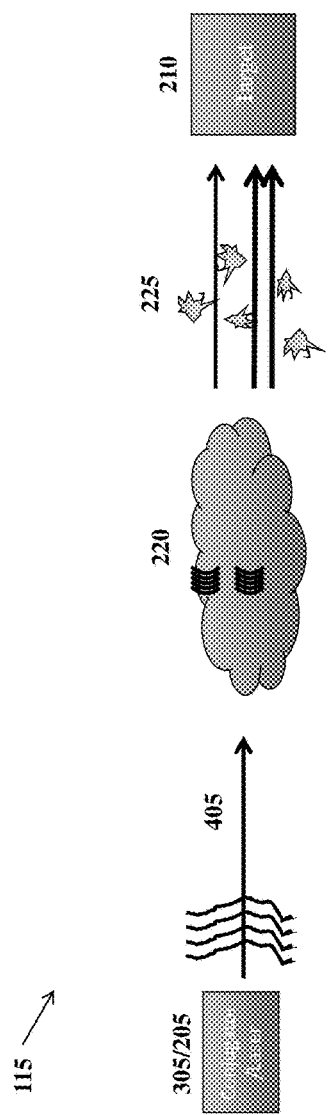
FIG. 4 is a diagram illustrating the step of generating a directed laser beam to the target with a computer generated hologram, in accordance with an exemplary embodiment of the invention.

FIG. 4 is a diagram illustrating the step 115 of generating a directed laser beam to the target with a computer generated hologram, in accordance with an exemplary embodiment of the invention. Step 115 can initiate an actual LIDAR process. In Step 115, the target 205 can be re-illuminated with an illuminator beam. However, this illuminator beam can be generated by reading the hologram created in Step 110 with a second reference beam creating a time-reversed wavefront 405. Essentially, the target 205 can be "re-imaged" upon itself with strong illumination. This time-reversed wavefront 405 can be generated with high gain and can retrace the path that originated from the source to the target 205, and the effects of distortions 220 and obstructions 225 can be reversed. Since the "signal" light reaching the conjugator in step 110 contains only photons that made it through the apertures between the obstructions 225, so too, the "corrected" wavefront returning to the target 205 in step 115 can bypass the obstructions 225 as well.

Figure 5:
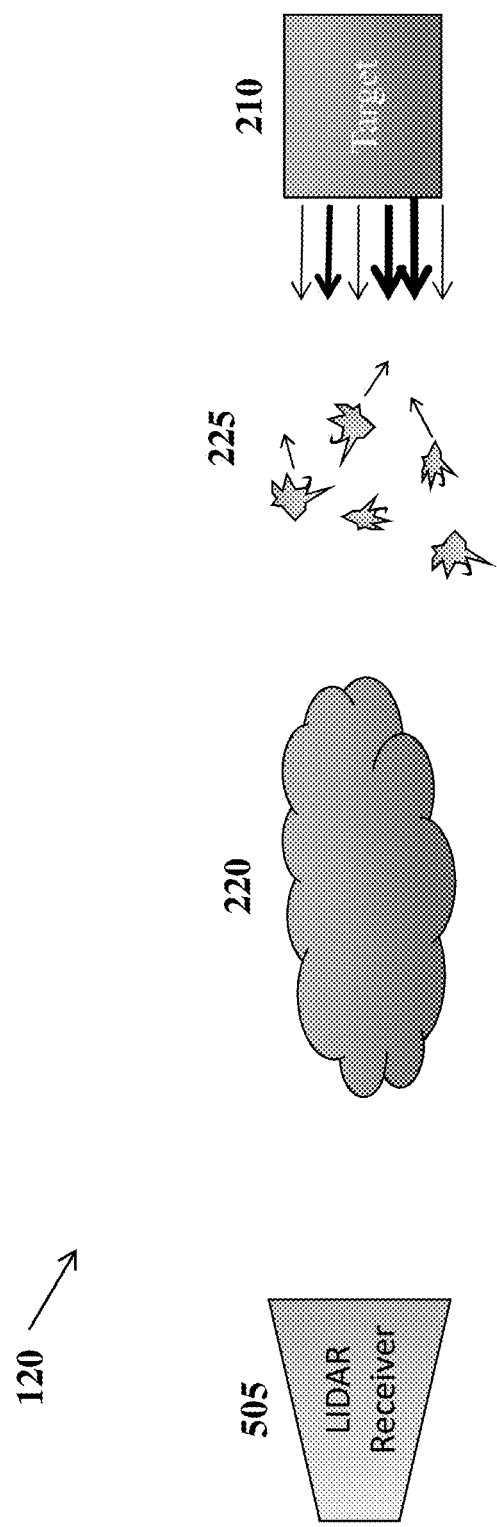
FIG. 5 is a diagram illustrating the step of receiving an enhanced return from the target, in accordance with an exemplary embodiment of the invention.

FIG. 5 is a diagram illustrating the step 120 of receiving an enhanced return from the target, in accordance with an exemplary embodiment of the invention. In step 120, a LIDAR receiver 505 can record the photons reflecting off the target 205, only with a much higher photon density and significantly increased signal-to-noise. In this instance though, the photons received come predominantly from the obscured target 205. Overall, the exemplary method 100 allows significantly more light to reach the target 205, and the light reflects and returns to the LIDAR receiver 505 making image formation many orders of magnitude more efficient that prior art systems.

In an exemplary embodiment of the invention, a bootstrapping process can be implemented. In the bootstrapping process, steps 110 and 115 can be repeated to generate a more concentrated illumination on the target 205. Essentially, it is a repetitive sequence where the light returned from the target 205 illuminated by the phase-conjugate beam in step 110 can be used to generate an updated hologram. The updated hologram can then be read out by a reference beam to re-illuminate the target in step 115. Even the initial low signal-to-noise hologram has some corrective ability, and the light it transmits is typically more concentrated on the target 205 than the initial search beam in step 105. Each iteration can improve the foliage penetrating efficiency or "fidelity" of the hologram. This, in turn gives rise to a higher S/N hologram. However, each subsequent cycle of repeating steps 110 and 115 can build up the hologram contrast to quickly maximize power on the target 205.

Figures 6A, 6B, 6C:
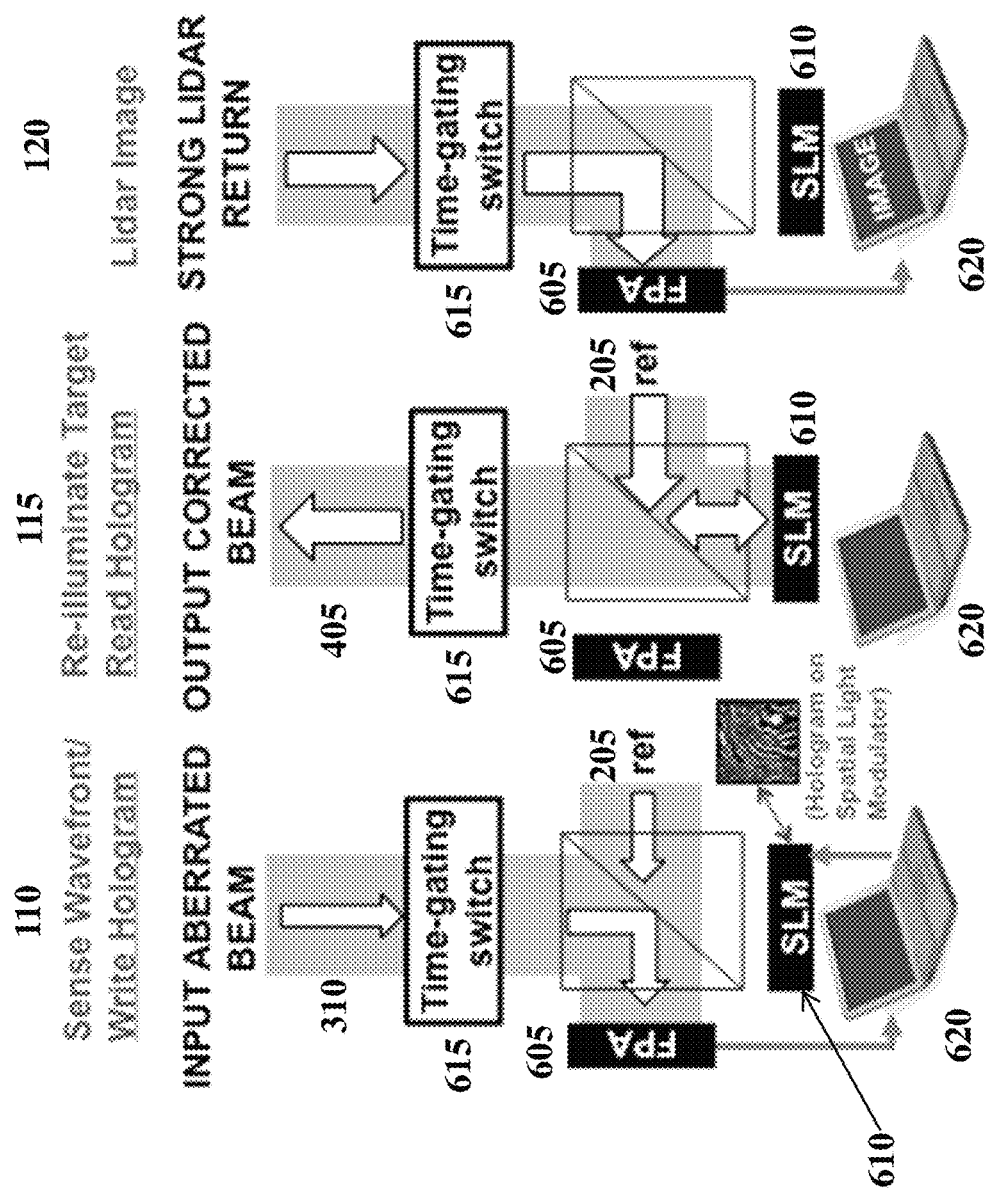
FIGS. 6a, 6b, and 6c are system diagrams of an image reconstruction system, in accordance with an exemplary embodiment of the invention.

FIGS. 6a, 6b, and 6c are system diagrams of an image reconstruction system, in accordance with an exemplary embodiment of the invention. Specifically, FIGS. 6a, 6b, and 6c correspond to steps 110, 115, and 120, respectively. The primary system components are a laser source 205, such as a narrowband laser illuminator; a focal plane array (FPA) interferometric wavefront sensor 605; a spatial light modulator (SLM) 610, which can generate the hologram; timing electronics and optical switching for time-gating laser pulse 615; and a fast hologram generation algorithms, which can translate interferogram to hologram output. A hologram generation module can be configured to perform the fast hologram generation algorithms, and can be implemented in a computer system 620 that comprises instructions stored in a machine-readable medium and a processor that executes the instructions.

One of ordinary skill in the art will understand that there may be more than one way to achieve phase conjugation; however, in an exemplary embodiment of the invention, step 110 can employ digital holography. As represented in FIG. 6a, and corresponding step 110, digital holography involves the measurement of the "imprinted" wavefront 310 returned by the target 205 and subsequent generation of a 2-D hologram on the surface of a spatial light modulator 610. The wavefront can be characterized interferometrically. As represented in FIG. 6b, and corresponding step 115, the target return 405 can be recorded on a focal plane array 605 that can be simultaneously illuminated by a reference beam 205 at the same wavelength. The interference pattern that results can be a direct measurement of the wavefront spatial phase and intensity. This information can be translated to a spatial light modulator 610 that is then a hologram that can be illuminated by a second reference beam 205 (indicated by the arrow pointing towards the spatial light modulator 610). If this second reference beam is generated to be in a direction exactly opposite the first reference beam, the resulting output can be phase conjugate to the input signal.

The "Time-gating switch" 615 can be achieved by a variety of means. Its primary function is to "gate out," or exclude, light returning from the target 210 that may be reflecting from objects, such as foliage or other obscurations, which are in front of the target of interest 210. This light could conceivably be much more intense than that from the target 210 and could potentially overwhelm the focal plane array 605, limit dynamic range, and add increased noise to the electronic signal. Time-gating can be achieved by using an optical switch (e.g., Pockels Cell, Kerr Cell, Acousto-optics modulator, or something similar), or by using a sensor that has an inherent gating capability. For example, this could be an intensified focal plane array 605.

The final LIDAR measurement in Step 120 can be shown to occur using the same components as early stages in the process. In Step 120, the time-gating switch 615 can be used to successively select a particular range in the object region. The time-gating switch 615 can be turned on at increasingly longer delay intervals to measure signal return as a function of delay, which is the same as being a function of range. Thus, the 3D LIDAR image can be generated. In another embodiment, a separate LIDAR sensor could be used that records the return from the target 210 as a function of time, as is typically done in standard LIDAR systems. The first embodiment can be advantageous as the light returned from the target 210 can be more intense than in conventional LIDAR because the target 210 is more intensely illuminated by bypassing the obscuration initially.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations; such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Portions of the invention can comprise a computer program that embodies the functions described herein. Furthermore, the modules described herein, such as the hologram generation module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer implemented tool is explained herein in more detail read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:
1. A method, comprising the steps of:
illuminating an extended target with a laser source, wherein the extended target is partially obscured by an obscuration;
sensing a reflected wavefront from the extended target with a conjugator, wherein the reflected wavefront is generated by laser energy of the laser source;
determining a hologram based on the reflected wavefront;
generating a directed laser beam to the extended target with the hologram, wherein the directed laser beam generates a plurality of time-reversed wavefronts;
repeating the steps of sensing the reflected wavefront from the extended target with the conjugator and generating the directed laser beam to the extended target with an updated hologram one or more times to generate a more concentrated illumination on the extended target with respect to the obscuration, wherein the updated hologram improves a penetrating efficiency of the directed laser beam through the obscuration;

using a time-gating switch to select a particular range of the plurality of time-reversed wavefronts for the extended target, wherein the particular range of the plurality of time-reversed wavefronts includes only light returns of the more concentrated illumination that are reflected from a target distance range beyond the obscuration;

receiving an enhanced return from the extended target with a receiver, wherein the enhanced return is generated by the particular range of the plurality of time-reversed wavefronts; and generating a three-dimensional (3D) image of the extended target based on the enhanced return.

2. The method of claim 1, wherein the step of illuminating the extended target comprises illuminating the extended target with a wide-area illuminating beam.

3. The method of claim 1, wherein the imprinted wavefront is imprinted with effects from beam distortions and obstructions between the laser source and the extended target.

4. The method of claim 1, wherein the step of generating the directed laser beam to the extended target with a hologram comprises the step of generating the directed laser beam by reading the hologram with a reference beam creating a time-reversed wavefront.

5. The method of claim 4, wherein the time-reversed wavefront is generated with high gain.

6. The method of claim 4, wherein the time-reversed wavefront retraces the path that originated from the laser source to the extended target.

7. The method of claim 4, wherein the time-reversed wavefront reverses the effects of beam distortions and obstructions.

8. The method of claim 1, wherein using the time-gating switch to select the particular range comprises activating the time-gating switch at increasingly longer delay intervals to measure the plurality of time-reversed wavefronts as a function of delay.

9. A computer implemented system, comprising:
a laser source configured to illuminate an extended target, wherein the extended target is partially obscured by an obscuration;
a conjugator configured to:
sense a reflected wavefront from the extended target, wherein the reflected wavefront is generated by laser energy of the laser source, and
determine a hologram based on the reflected wavefront;
a spatial light modulator configured to generate the hologram that is provided to the laser source to generate a directed laser beam to the extended target, wherein the directed laser beam generates a plurality of time-reversed wavefronts;
wherein the conjugator and the spatial light modulator are configured to repeat the steps of sensing the reflected wavefront from the extended target and generating the directed laser beam to the extended target with an updated hologram one or more times to generate a more concentrated illumination on the extended target with respect to the obscuration, wherein the updated hologram improves a penetrating efficiency of the directed laser beam through the obscuration;
a time-gating switch configured to select a particular range of the plurality of time-reversed wavefronts for the extended target, wherein the particular range of the plurality of time-reversed wavefronts includes only light returns reflected from a target distance range beyond the obscuration; and
a receiver configured to receive an enhanced return from the extended target, wherein the enhanced return is generated by the particular range of the plurality of time-reversed wavefronts.

10. The system of claim 9, wherein the time-gating switch is configured to select the particular range by activating at increasingly longer delay intervals to measure the plurality of time-reversed wavefronts as a function of delay.

* * * * *